US007555644B2

(12) United States Patent
Bharathy et al.

(10) Patent No.: US 7,555,644 B2
(45) Date of Patent: Jun. 30, 2009

(54) SYSTEM AND METHOD FOR OPERATING SYSTEM IMAGE PROVISIONING IN A UTILITY COMPUTING ENVIRONMENT

(75) Inventors: Karthik G S Bharathy, Karnataka (IN); Guhendran B Devendran, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 289 days.

(21) Appl. No.: 11/459,030

(22) Filed: Jul. 21, 2006

(65) Prior Publication Data

US 2007/0239978 A1   Oct. 11, 2007

(30) Foreign Application Priority Data

Jul. 22, 2005   (IN)   ............ 985/CHE/2005

(51) Int. Cl.
 *G06F 15/177*   (2006.01)
 *G06F 9/00*   (2006.01)
 *G06F 13/00*   (2006.01)
 *G11C 29/00*   (2006.01)
(52) U.S. Cl. ............ 713/2; 713/100; 711/114; 714/770

(58) Field of Classification Search ............ 713/2, 713/100; 711/114; 714/770
See application file for complete search history.

(56) References Cited

U.S. PATENT DOCUMENTS

| 2003/0126242 | A1* | 7/2003 | Chang ............ 709/222 |
| 2005/0083749 | A1* | 4/2005 | Keohane et al. ............ 365/222 |
| 2005/0091215 | A1* | 4/2005 | Chandra et al. ............ 707/10 |
| 2005/0223210 | A1* | 10/2005 | Sasaki et al. ............ 713/2 |

* cited by examiner

*Primary Examiner*—Thomas Lee
*Assistant Examiner*—Stefan Stoynov (57) ABSTRACT

A technique to provision an OS image during a boot-up of a computing server in a utility computing environment using disk array's inherent raw concurrent multi-disk copy mechanism. In one example embodiment, this is achieved by forming a pool of OS image boot-up disks in a disk array using the disk array's internal disk copy routine. An OS image boot-up disk is assigned from the pool of OS image boot-up disks to the computing server upon receiving a request from the computing server. The OS image is then received from the assigned OS image boot-up disk. The computing server then boots-up using the received OS image and runs one or more applications residing in the computing server.

17 Claims, 3 Drawing Sheets

SYSTEM AND METHOD FOR OPERATING SYSTEM IMAGE PROVISIONING IN A UTILITY COMPUTING ENVIRONMENT

BACKGROUND OF THE INVENTION

Computer servers need an operating system (OS) image, usually stored on a disk, to boot-up and run software applications resident on the servers. Typically, the OS images are stored in the internal disks of the server and are referred to as boot-up disks. The servers that boot-up from their internal disks are confined to the OS image types stored in them. In a utility computing environment, resources, such as computing servers are provisioned dynamically for on-demand consumption as per a requested description. The resources in such an environment require the computing servers to boot-up from different OS images at different times as per the request description they are serving.

Provisioning servers with different OS images on their internal disks in an automated fashion is difficult and not scalable for multiple image types. Therefore, in a utility computing environment, the OS images are generally kept on an external disk connected to the computing servers over a network or Storage Area Network (SAN). The servers in such an environment boot via the SAN from this external disk. This typically provides the required flexibility to provide the servers with the capability to boot-up from different OS images at different times. The external disks are usually enclosed in their own dedicated hardware called "disk arrays". The disk arrays are generally connected to the computing servers via the SAN.

Generally, the boot-up disk; whether external or internal can only be accessed by one server at any given time. Therefore, in a utility computing environment, whenever a computing server is provisioned for use, a dedicated boot-up disk with a requested OS image in the disk arrays is also provisioned. The process of provisioning such an external disk for a computing server to boot-up in a utility computing environment is referred to as "OS image provisioning" or just "image provisioning". Typically, the process of OS image provisioning requires several steps. For each type of OS image; a disk with the master copy of the OS image is maintained in the disk array. The disk having the master copy of an OS image type is often referred to as a "golden image boot-up disk".

Whenever a request for a particular type of OS image boot-up disk comes from one or more computing servers, a boot-up disk that is not currently in use is identified in the disk array and allocated to the computing server's disk. The requested OS image is then copied from the associated golden image boot-up disk to the allocated disk. The copied OS image from the allocated boot-up disk is then sent to the computing server via the SAN such that the allocated boot-up disk is dedicated to the computing server while the OS image is being sent to the computing server via the SAN.

Conventional methods use special image copying servers that read the OS image from the golden image disks and write them to the boot-up disk in the disk arrays that are allocated to the computing servers. This process generally requires the data comprising the OS image to be sent from the disk array containing the golden image disk to a special server memory and then to be allocated to the intended boot-up disk. These results in the OS image being sent twice through the SAN connecting the special image copy server to the disk array, i.e., once during reading from the golden image boot-up disk and once when writing the OS image to the intended boot-up disk.

Very often both the golden image disk and the destination intended boot-up disk reside in the disk array. Such a process of communicating the data including the OS image in and out of the disk array via the SAN can at times overwhelm the SAN when there are concurrent requests for multiple different OS images that need to be provisioned. At times, this process can considerably slow down the OS image provisioning process in a utility computing environment. Further, the image copy process used in the conventional methods is generally not scalable to the size and number of OS image boot-up requests received from one or more computing servers in a utility computing environment. Furthermore, the image copying servers in the conventional methods can require a large amount of memory and very large I/O bandwidth. In addition, the conventional image copy process uses rudimentary raw copy mechanisms, for example the Unix "dd" command to copy the image. This can be very slow and can tie up the SAN.

BRIEF DESCRIPTION OF THE DRAWINGS

Embodiments of the invention will now be described, by way of example only, with reference to the accompanying drawings in which.

DETAILED DESCRIPTION OF THE INVENTION

There will be described a method for OS image provisioning in a utility computing environment, the method comprising the steps of:
  a) forming a pool of OS image boot-up disks in a disk array using an internal disk copy routine and a golden image disk including a desired OS image;
  b) receiving a request for an OS image boot-up disk for a computing server by the pool of OS image boot-up disks;
  c) assigning an OS image boot-up disk from the pool of OS image boot-up disks to the computing server upon receiving the request; and
  d) booting-up the computing server using the assigned OS image boot-up disk.

Preferably, an upper and lower number of OS image boot-up disks are determined based on a utility computing environment parameter. The pool of OS image boot-up disks is formed by making copies of a desired OS image from a golden image disk in the disk array using the disk array's internal disk copy routine. Preferably, the size of the pool is greater than or equal to the determined lower number of OS image boot-up disks. Preferably, the utility computing environment parameter is based on an average number of requests received for OS image boot-up disks from one or more computing servers during a pre-determined amount of time. The OS image is selected from the group comprising a Unix OS image, Windows OS image, and Linux OS image.

There will also be described an article including a storage medium having instructions that, when decoded by a computing platform, result in execution of a method for OS image provisioning in a utility computing environment, the method comprising the steps of:
  a) forming a pool of OS image boot-up disks in a disk array using disk array's internal disk copy routine and a golden image disk including a desired OS image;
  b) receiving a request for an OS image boot-up disk for a computing server by the pool of OS image boot-up disks;
  c) assigning an OS image boot-up disk from the pool of OS image boot-up disks to the computing server upon receiving the request; and
  d) booting-up the computing server using the assigned OS image boot-up disk.

There will also be described a system for OS image provisioning in a utility computing environment, the system comprising:
  a) a processor; and
  b) a memory coupled to the processor, the memory having stored therein code which when decoded by the processor, the code causes the processor to perform a method comprising:
    1) forming a pool of OS image boot-up disks in a disk array using disk array's internal disk copy routine and a golden image disk;
    2) receiving a request for an OS image boot-up disk for a computing server by the pool of OS image boot-up disks;
    3) assigning an OS image boot-up disk from the pool of OS image boot-up disks to the computing server upon receiving the request; and
    4) booting-up the computing server using the assigned OS image boot-up disk.

There will also be described a system for OS image provisioning in a utility computing environment, the system comprising:
  a) a disk array having a pool of OS image boot-up disks and a golden image boot-up disk including an OS image, wherein the disk array has a internal disk copy routine;
  b) an image manager server coupled to the disk array; and
  c) one or more computing servers coupled to the disk array via a SAN, wherein the image manager server creates a pool of OS image boot-up disks in the disk array using the golden image boot-up disk and the internal disk copy routine, wherein the image manager server assigns an OS image boot-up disk to the computing server, upon receiving a request from the computing server for an image by the disk array, wherein the computing server to receive the OS image from the assigned OS image boot-up disk, and wherein the computing server to boot-up using the received OS image.

In the following detailed description of the various embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

The term "internal disk copy routine", which is also referred to as "array based copy mechanism" is a raw concurrent multi-disk copy replication function that is generally supported in the current disk array firmware. For example, a disk array can support an internal disk copy routine that can make about 1-3 copies of a source disk concurrently. When the internal disk copy routine is executed, the copy process in the disk array copies data from a source disk to 3 disks. During such a process the data does not leave the disk array chassis as the data transfer takes place within the disk array. The process of copying, controlling, and managing of the disk array is generally performed by an external server connected to the disk array. The terms "utility computing environment" and "utility data center" are used interchangeably throughout the document.

The proposed technique copies the golden image to a server disk using the internal disk copy routine that is present in disk array firmwares for image copy so that the entire copy activity can occur independent of the computing server and OS image provisioning.

Figure 1:
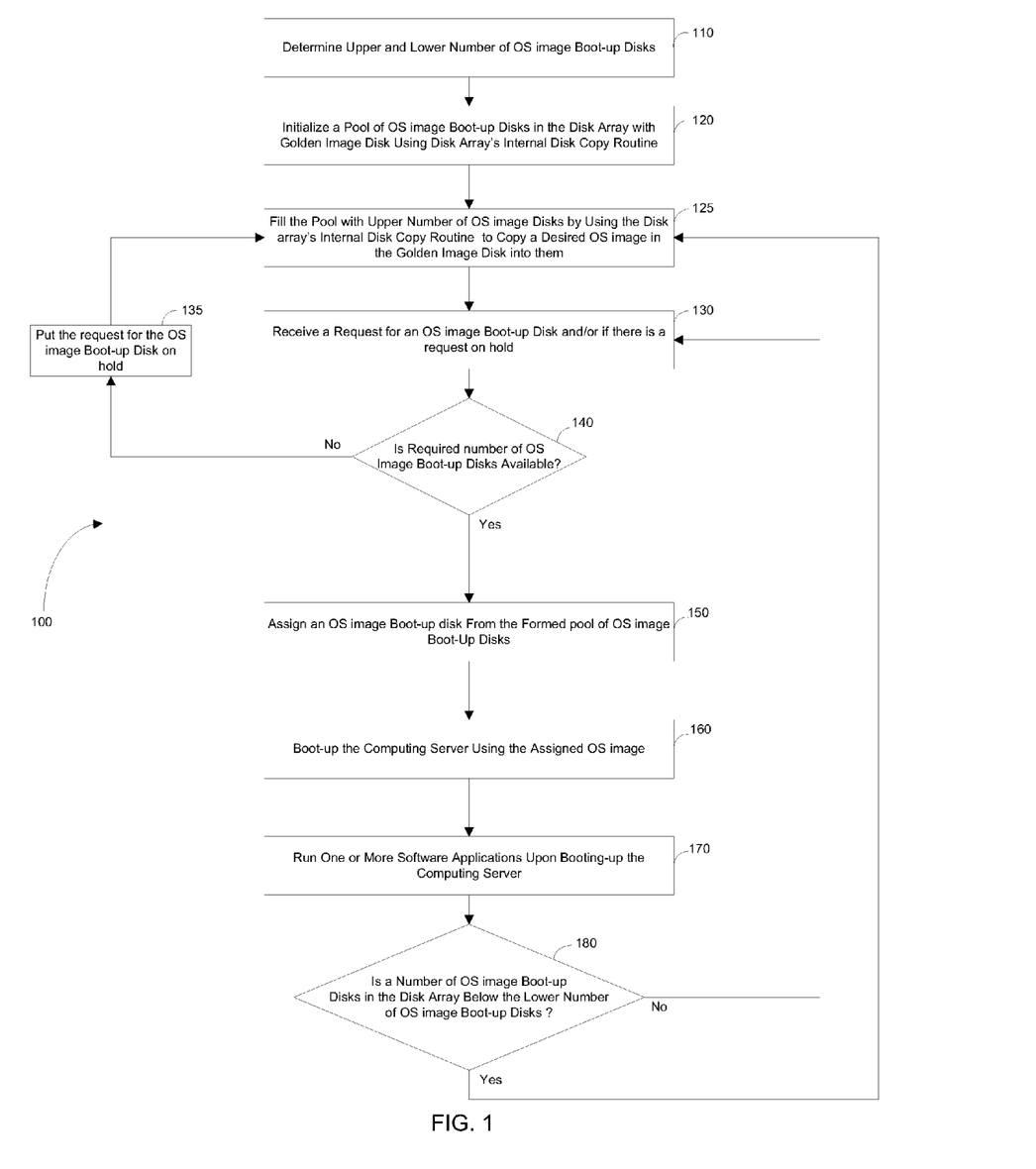
FIG. 1 is a flowchart illustrating an example method of OS image provisioning in a utility computing environment according to an embodiment of the present invention.

FIG. 1 illustrates an example method 100 of OS image provisioning in a utility computing environment. The method 100 forms a pool of OS image boot-up disks using disk array's internal disk copy routine and a golden image disk including a desired OS image using the steps 110-125 as shown in FIG. 1. In some embodiments, the method 100 forms one or more pools of OS image boot-up disks using each associated disk array's internal disk copy routine. In some embodiments, the method 100 forms one or more arrays of OS image boot-up disks using each associated disk array's internal disk copy routine. At 110, this example method 100 determines an upper number of OS image boot-up disks and a lower number of OS image boot-up disks that may be required for an improved OS image provisioning performance based on utility computing environment parameters. In these embodiments, the lower number of OS image boot-up disks is an indicator of a lowest number of (cumulative) OS image boot-up disks in the pool below which the pool will be replenished. The upper number of OS image boot-up disks is an indicator of the largest number of OS image boot-up disks that are needed in the image pool for the system to provide a faster service to request for a computer server OS image disk.

In some embodiments, the administrator of the utility computing environment can compute the upper and lower number of OS image boot-up disks based on a utility computing parameter, such as an average number of computing server requests received for OS image boot-up disks within a predetermined amount of time. The utility computing environment parameters can also be based on parameters, such as type of application needed on the OS (i.e., windows based applications need windows operating systems, Unix based applications need Unix operating systems and so on), operational familiarity of a user (i.e., Linux users prefer Linux OS and so on), function (i.e., desktop, development, database, email and so on), stability and/or support (i.e., preference of OS may be based on stability and availability of support services) and the like.

At 120, a pool of OS image boot-up disks in the disk array is initialized with a golden image disk using disk array's internal disk copy routine. At 125, the pool of OS image disks are filled such that the number of OS image boot-up disks in the disk array is greater than or equal to the lower number of OS image boot-up disks and lesser than or equal to the upper number of OS image boot-up disks by using the disk array's internal disk copy routine to copy the desired OS image in the golden image disk.

In these embodiments, the pool of OS image boot-up disks are formed by copying the OS image from a golden image boot-up disk in the disk array using the disk array's internal disk copy routine. Also in these embodiments, the pool of OS image boot-up disks are initialized with the number of OS image boot-up disks as determined by the upper number of OS image boot-up disks using the internal disk copy routine on the golden image present in the disk array. For example, if the upper number of OS image boot-up disks is equal to or greater than 9 and if the disk array's internal disk copy routine can make about 3 copies concurrently, then the internal disk copy routine will be repeated 3 times to copy the golden image present in the disk array to create 9 OS image boot-up disks. The pool of OS image boot-up disks can be formed by copying golden images, such as Unix OS image, Windows Image, Linux image, and so on.

A given image in multiple arrays can have a pool in each disk array to distribute the access load. The distribution of image pools across multiple arrays can be designed such that it can be configured by a data center administrator. The system can also be designed such that for an image with pools in more than one array the allocation can be done from different disk arrays in a round-robin way.

In some embodiments, the method 100, at 125, forms one or more pools of OS image boot-up disks using the disk array's internal disk copy routine. In these embodiments, each of the pools can have different OS image boot-up disks. For example, each of the pools can have OS image boot-up disks, such as Unix OS image boot-up disks, Windows OS image boot-up disks, Linux OS image boot-up disks, and so on. In some embodiments, the method 100 at 125 forms one or more arrays of OS image boot-up disks using each associated disk array's internal disk copy routine.

At 130, a request is received by the pool of OS image boot-up disks for an OS image boot-up disk. In some embodiments, at 130, a request is received by the pool of OS image boot-up disks via a SAN from a computing server for an OS image boot-up disk. In one embodiment, an image boot-up disk from the pool of OS image boot-up disks is assigned upon receiving the request. Also at 130, the method 100 determines if there is a request on hold.

At 140, the method 100 determines for availability of a required number of OS image boot-up disks in the pool of OS image boot-up disks upon receiving a request for an OS image boot-up disk from the computing server. Based on the determination at step 140, if one or more OS image boot-up disks are available for assigning the OS image boot-up disk to the computing server, then the method 100 goes to step 150 and assigns an OS image boot-up disk to the computing server. In some embodiments, the method 100 goes to step 150 and assigns requested OS image boot-up disks from the formed pool of OS image boot-up disks.

Based on the determination at 140, if the one or more OS image boot-up disks are not available for assigning the OS image boot-up disks to the computing server, then the method 100 goes to step 135 and puts the received request for an OS image boot-up disk on hold, pending server, and repeats steps 125-140. In these embodiments, the pool of OS image boot-up disks are initialized with the number of OS image boot-up disks as determined by the upper number of OS image boot-up disks using the internal disk copy routine on the golden image present in the disk array. It can be envisioned that the method 100 can be designed to use temporarily one or more OS image boot-up disks as the root disks when executing the internal disk copy routine to replenish the pool of OS image boot-up disks to speed up the process of replenishing. Once the pool is replenished, the temporarily used OS image boot-up disks can be returned to the pool of OS image boot-up disks. In case the golden image disk is modified for reasons, such as patching the OS image and the like, the OS image boot-up disks are re-copied using the internal disk copy routine to synchronize the OS image boot-up disks with the updated golden image disk.

In some embodiments, the method 100 at 140 checks for a type of OS image requested by the computing server. In these embodiments, based on the determination at 140, the method 100 assigns one of the OS image boot-up disks from the one of the one or more pools of OS image boot-up disks to the computing server. In some embodiments, the method 100 assigns one of the OS image boot-up disks from the one or more arrays of OS image boot-up disks to the computing server as requested.

At 160, the computing server boots-up using the received OS image from the assigned OS image boot-up disk. At 170, the computing server runs one or more software applications upon completing the boot-up using the received OS image.

At 180, the method 100 determines whether a number of available OS image boot-up disks in the disk array is below the lower number of OS image boot-up disks. Based on the determination at 180, the method 100 goes to step 125, if the number of available OS image boot-up disks in the disk array is below the lower number of OS image boot-up disks. Based on the determination at 180, the method 100 goes to step 130 if the number of available OS image boot-up disks in the disk array is not below the lower number OS image boot-up disks.

The above-described technique was verified for performance by forming full three tier 9 OS image boot-up disks each having a memory size of 7 Gigabytes. The 9 OS image boot-up disks were formed from a single Unix OS disk of the same size using the internal disk copy routine in the HP StorageWorks XP Series 512 disk array. The time required to copy the OS image from the source to the destination disks was measured to be about 4 minutes and the termination of the copy link process took less than about one minute. This total measured time of about 5 minutes to copy the OS image from the source to the destination disks was less than the measured copy time of about 7 minutes generally required when using the Unix "dd" command to copy the OS image from the source to the destination disks.

Although the flowchart 100 includes steps 110-180 that are arranged serially in the exemplary embodiments, other embodiments of the subject matter may decode two or more steps in parallel, using multiple processors or a single processor organized as two or more virtual machines or sub-processors. Moreover, still other embodiments may implement the steps as two or more specific interconnected hardware modules with related control and data signals communicated between and through the modules, or as portions of an application-specific integrated circuit. Thus, the exemplary process flow diagrams are applicable to software, firmware, and/or hardware implementations.

Figure 2:
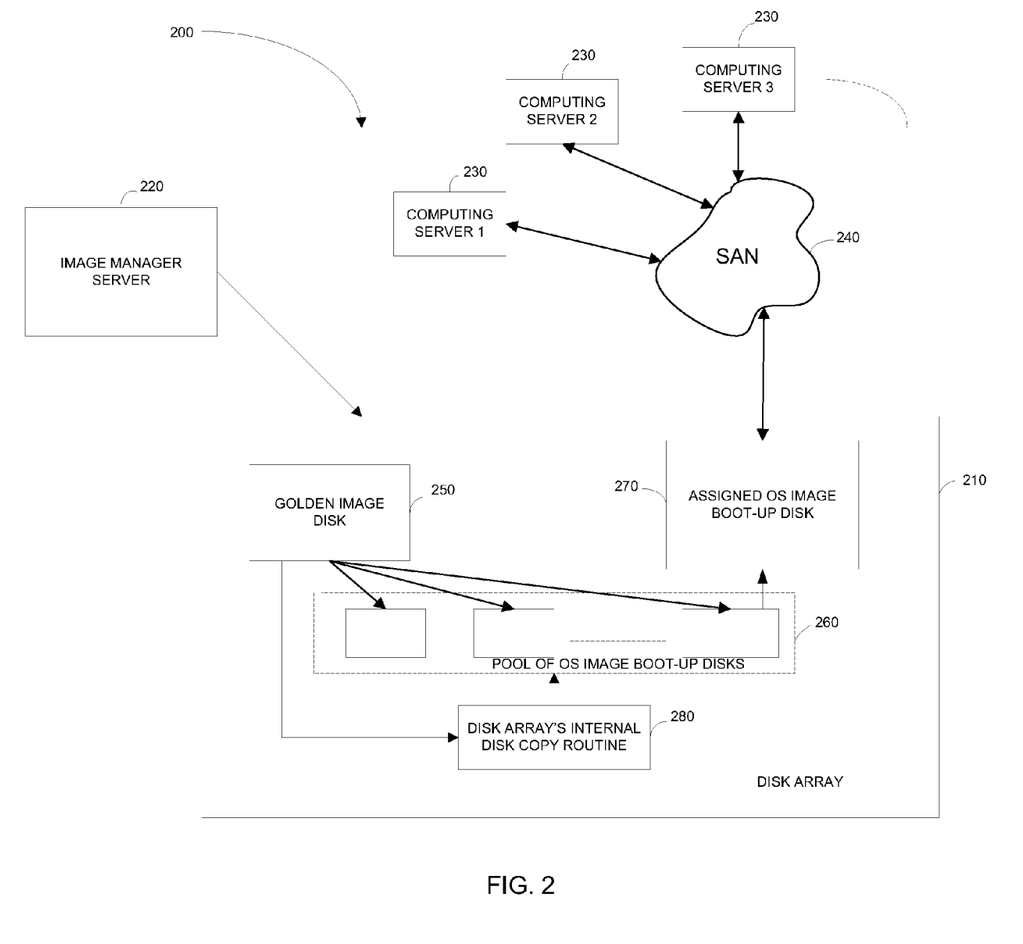
FIG. 2 is a block diagram illustrating an example utility computing system to implement the method for performing OS image provisioning according to FIG. 1.

Referring now to FIG. 2, there is illustrated a block diagram of an example OS image provisioning system 200 for implementing the method 100 for OS image provisioning of FIG. 1. The system 200 includes a disk array 210, an image manager server 220, a network or storage area network (SAN) 240, and one or more computing servers 230. As shown in FIG. 2, the disk array 210 includes a golden image boot-up disk 250, a pool of OS image boot-up disks 260, an assigned OS image boot-up disk 270 coupled to the one or more computing servers 230 via the SAN 240, and a internal disk copy routine 280.

In operation, the image manager server 220 creates a pool of OS image boot-up disks 260 by copying the OS image residing in the golden image boot-up disk 250 using the inherent internal disk copy routine in the disk array 210. In these embodiments, the image manager server 220 initiates creation of the pool of OS images boot-up disks 260 in the disk array 210. The disk array 210 then copies the OS image residing in the golden image boot-up disk 250 to each boot-up disk in the array 210 to form the pool of OS image boot-up disks 260 upon receiving the initiation to create the pool of OS image boot-up disks 260 from the image manager server 220.

In some embodiments, the image manager server 220 determines an upper number of OS image boot-up disks and a lower number of OS image boot-up disks for the pool of OS image boot-up disks 260 based on a utility computing environment parameter. The imager manager server 220 then forms the pool of OS image boot-up disks 260 in the disk array 210 by copying the OS image from the golden image boot-up disk 250 in the disk array 210 using the disk array's internal disk copy routine as determined by the upper number of OS image boot-up disks. In these embodiments, the image manager server 220 computes the utility computing environment parameter based on a number of requests received for the OS image boot-up disks 260 from the one or more computing servers 230 in a predetermined amount of time.

The image manager server 220 then assigns an OS image boot-up disk to a computing server upon receiving a request from one of the one or more computing servers 230 for an OS image boot-up disk by the disk array 210. The computing server, as described in the request, then receives the OS image from the assigned OS image boot-up disk and boots-up using the received OS image.

In some embodiments, the image manager server 220 determines the availability of an OS image boot-up disk in the pool of OS image boot-up disks 260 upon receiving a request for an OS image. The image manager server 220 then assigns the OS image boot-up disk to the computing server if the OS image boot-up disk is available in the disk array 210. The image manager server 220 creates the pool of OS image boot-up disks 260 in the disk array 210 by copying the OS image from the golden image boot-up disk in the disk array using the disk array's internal disk copy routine such that the number of OS image boot-up disks in the pool of OS image boot-up disks 260 is equal to or greater than the upper number of OS image boot-up disks, if the OS image boot-up disk is not available in the disk array. The image manager server 220 then assigns the OS image boot-up disk to the computing server upon replenishing the pool of OS image boot-up disks 260. In these embodiments, the pool of OS image boot-up disks can include OS images, such as a Unix OS image, Windows OS image, Linux OS image, and the like.

The operation of the OS image provisioning system 200 shown in FIG. 2 is explained in more detail with reference to the FIG. 1.

Various embodiments of the present invention can be implemented in software, which may be run in the environment shown in FIG. 3 (to be described below) or in any other suitable computing environment. The embodiments of the present invention are operable in a number of general-purpose or special-purpose computing environments. Some computing environments include personal computers, general-purpose computers, server computers, hand-held devices (including, but not limited to, telephones and personal digital assistants (PDAs) of all types), laptop devices, multi-processors, microprocessors, set-top boxes, programmable consumer electronics, network computers, minicomputers, mainframe computers, distributed computing environments and the like to decode code stored on a computer-readable medium. The embodiments of the present invention may be implemented in part or in whole as machine-executable instructions, such as program modules that are decoded by a computer. Generally, program modules include routines, programs, objects, components, data structures, and the like to perform particular tasks or to implement particular abstract data types. In a distributed computing environment, program modules may be located in local or remote storage devices.

Figure 3:
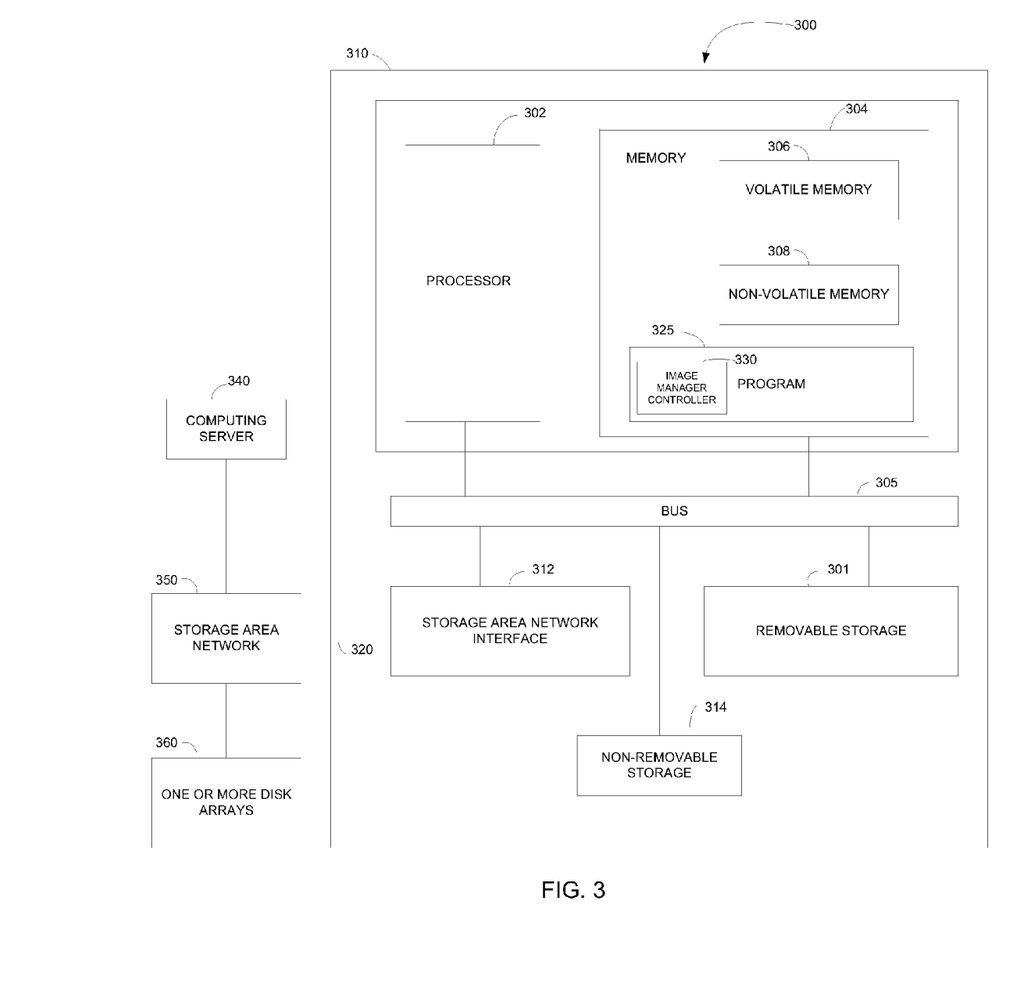
FIG. 3 is a block diagram of a typical computer system used for OS image provisioning according to various embodiments of the present invention, examples being those shown in FIG. 1 and FIG. 2.

FIG. 3 shows an example of a suitable computing system environment for implementing embodiments of the present invention. FIG. 3 and the following discussion are intended to provide a brief, general description of a suitable computing environment in which certain embodiments of the inventive concepts contained herein may be implemented.

A general computing device, in the form of a computer 310, may include a processor 302, memory 304, removable storage 301, and non-removable storage 314. Computer 310 additionally includes a bus 305 and a storage area network interface (NI) 312.

Computer 310 may include or have access to a utility computing environment that includes one or more computing servers 340 and one or more disk arrays 360, a SAN 350 and one or more communication connections 320 such as a network interface card or a USB connection. The computer 310 may operate in a networked environment using the communication connection 320 to connect to the one or more computing servers 340. A remote server may include a personal computer, server, router, network PC, a peer device or other network node, and/or the like. The communication connection may include a Local Area Network (LAN), a Wide Area Network (WAN), and/or other networks.

The memory 304 may include volatile memory 306 and non-volatile memory 308. A variety of computer-readable media may be stored in and accessed from the memory elements of computer 310, such as volatile memory 306 and non-volatile memory 308, removable storage 312 and non-removable storage 314. Computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, memory cards, Memory Sticks™, and the like; chemical storage; biological storage; and other types of data storage.

"Processor" as used herein, means any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics processor, a digital signal processor, or any other type of processor or processing circuit. The term also includes embedded controllers, such as generic or programmable logic devices or arrays, application specific integrated circuits, single-chip computers, smart cards, and the like.

Embodiments of the present invention may be implemented in conjunction with program modules, including functions, procedures, data structures, application programs, etc., for performing tasks, or defining abstract data types or low-level hardware contexts.

Machine-readable instructions stored on any of the above-mentioned storage media are executable by the processor 302 of the computer 310. For example, a computer program 325 including an image manager controller 330 may comprise machine-readable instructions capable of performing OS image provisioning according to the teachings and herein described embodiments of the present invention. In one embodiment, the computer program 325 may be included on a CD-ROM and loaded from the CD-ROM to a hard drive in non-volatile memory 308. The machine-readable instructions cause the computer 310 to perform OS image provisioning according to the various embodiments of the present invention.

The OS image provisioning technique of the present invention is modular and flexible in terms of usage in the form of a "Distributed Configurable Architecture". As a result, parts of the OS image provisioning system may be placed at different points of a network, depending on the model chosen. For example, the technique can be deployed in a server and the input and output instructions streamed over from a client to the server and back, respectively. The image manager controller 330 can also be placed on each client, with the centralized database management. Such flexibility allows faster deployment to provide a cost effective solution to changing business needs.

The above-described technique allows pre-configured images to be available during a computer server provisioning in a utility computing environment. The entire OS image copy process takes place outside the computer server provisioning task. This makes the overall computer server provisioning task faster than the current approach in a utility data center. Further, the proposed technique requires less memory and provides a faster access to an OS image boot-up disk, when compared with the considerable I/O overhead imposed by the conventional techniques which uses a command, such as Unix "dd" to copy the golden image to a server boot-up disk.

The above description is intended to be illustrative, and not restrictive. Many other embodiments will be apparent to those skilled in the art. The scope of the invention should therefore be determined by the appended claims, along with the full scope of equivalents to which such claims are entitled.

The above-described methods and apparatus provide various embodiments for encoding characters. It is to be understood that the above-description is intended to be illustrative, and not restrictive. Many other embodiments will be apparent to those of skill in the art upon reviewing the above-description. The scope of the subject matter should, therefore, be determined with reference to the following claims, along with the full scope of equivalents to which such claims are entitled.

As shown herein, the present invention can be implemented in a number of different embodiments, including various methods, a circuit, an I/O device, a system, and an article comprising a machine-accessible medium having associated instructions.

Other embodiments will be readily apparent to those of ordinary skill in the art. The elements, algorithms, and sequence of operations can all be varied to suit particular requirements. The operations described-above with respect to the method 100 illustrated in FIG. 1 can be performed in a different order from those shown and described herein.

FIG. 1, FIG. 2, and FIG. 3 are merely representational and are not drawn to scale. Certain proportions thereof may be exaggerated, while others may be minimized. FIG. 1, FIG. 2 and FIG. 3 illustrate various embodiments of the invention that can be understood and appropriately carried out by those of ordinary skill in the art.

It is emphasized that the Abstract is provided to comply with 37 C.F.R. § 1.72(b) requiring an Abstract that will allow the reader to quickly ascertain the nature and gist of the technical disclosure. It is submitted with the understanding that it will not be used to interpret or limit the scope or meaning of the claims.

In the foregoing detailed description of the embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the detailed description of the embodiments of the invention, with each claim standing on its own as a separate preferred embodiment.

The invention claimed is:

1. A method for OS image provisioning in a utility computing environment comprising:
    forming a pool of OS image boot-up disks in a disk array using disk array's internal disk copy routine and a golden image disk including a desired OS image, wherein forming the pool of OS image boot-up disks using the disk array's internal disk copy routine comprises:
        determining an upper number of OS image boot-up disks and a lower number of OS image boot-up disks for the pool of OS image boot-up disks based on a utility computing environment parameter;
        initializing a pool of OS image boot-up disks in the disk array with the golden image disk using the disk array's internal disk copy routine; and
        filling the pool of OS image boot-up disks such that the number of OS image boot-up disks in the disk array is greater than or equal to the lower number of OS image boot-up disks and lesser than or equal to the upper number of OS image boot-up disks by using the disk array's internal disk copy routine to copy the desired OS image in the golden image disk;
    receiving a request for an OS image boot-up disk for a computing server by the pool of OS image boot-up disks;
    assigning an OS image boot-up disk from the pool of OS image boot-up disks to the computing server upon receiving the request; and
    booting-up the computing server using the assigned OS image boot-up disk.

2. The method of claim 1, wherein, in determining the upper and lower number of OS image boot-up disks, the utility computing environment comprises an average number of requests received for OS image boot-up disks from one or more computing servers during a predetermined amount of time.

3. The method of claim 1, wherein assigning the OS image boot-up disk from the pool of OS image boot-up disks to the computing server comprises:
    determining whether required number of OS image boot-up disk are available in the pool OS image boot-up disks in the disk array upon receiving a request for an OS image boot-up disk;
    if not, putting the request for the OS image boot-up disk on hold and filling the pool of OS image boot-up disks such that the number of OS image boot-up disks in the disk array is greater than or equal to the lower number of OS image boot-up disks and lesser than or equal to the upper number of OS image boot-up disks by using the disk array's internal disk copy routine to copy the desired OS image in the golden image disk;
    if so, assigning an OS image boot-up disk from the pool of OS image boot-up disks to the computing server upon receiving the request for an OS image boot-up disk or if there are any requests for an OS image boot-up disk on hold; and if so, assigning an OS image boot-up disk if there is a request for an OS image boot-up disk on hold.

4. The method of claim 1, further comprising:

determining whether number of available OS image boot-up disks in the disk array is below the lower number of OS image boot-up disks;

if so, filling the pool of OS image boot-up disks such that the number of OS image boot-up disks in the disk array is greater than or equal to the lower number of OS image boot-up disks and lesser than or equal to the upper number of OS image boot-up disks by using the disk array's internal disk copy routine to copy the desired OS image in the golden image disk;

if not, receiving a request for an OS image boot-up disk for a computing server by the pool of OS image boot-up disks; and if not, determining whether there is a request on hold for an OS image boot-up disk and assigning the OS image boot-up disk if there is a request on hold for an OS image boot-up disk.

5. The method of claim 1 further comprising:

running one or more software applications residing in the computing server upon completing the boot-up of the computing server using the OS image boot-up disk.

6. A method as claimed in claim 1 comprising:

forming one or more pools of OS image boot-up disks using disk array's internal disk copy routine, wherein each pool has different types of OS image boot-up disks;

receiving a request from a computing server for an OS image boot-up disk by one of the one or more pools of OS image boot-up disks via a SAN;

determining type of OS image requested by the computing server;

assigning one of the OS image boot-up disks from the one of the one or more pools of OS image boot-up disks to the computing server as a function of the determination;

receiving the OS image from the assigned one of the OS image boot-up disks by the computing server; and booting-up the computing server using the received OS image.

7. The method of claim 6, wherein the one or more pools of OS image boot-up disks comprises image boot-up disks selected from the group comprising Unix OS image boot-up disks, Windows OS image boot-up disks, and Linux OS image boot-up disks.

8. A method as claimed in claim 1 comprising:

forming one or more arrays of OS image boot-up disks using each associated disk array's internal disk copy routine;

receiving a request from a computing server for an OS image boot-up disk by one of the one or more arrays of OS image boot-up disks via a SAN;

assigning one of the OS image boot-up disks from the one or more arrays of OS image boot-up disks to the computing server;

receiving the OS image from the assigned one of the OS image boot-up disks; and booting-up the computing server using the received OS image.

9. The method of claim 8, wherein each array comprises OS image boot-up disks selected from the group comprising Unix OS image boot-up disks, Windows OS image boot-up disks, and Linux OS image boot-up disks.

10. An article comprising:

a storage medium having instructions that, when decoded by a computing platform, result in execution of a method comprising:

forming a pool of OS image boot-up disks in a disk array using disk array's internal disk copy routine and a golden image disk, wherein forming the pool of OS image boot-up disks using the disk array's internal disk copy routine comprises:

determining an upper number of OS image boot-up disks and a lower number of OS image boot-up disks for the pool of OS image boot-up disks based on a utility computing environment parameter;

initializing a pool of OS image boot-up disks in the disk array with the golden image disk using the disk array's internal disk copy routine; and filling the pool of OS image boot-up disks such that the number of OS image boot-up disks in the disk array is greater than or equal to the lower number of OS image boot-up disks and lesser than or equal to the upper number of OS image boot-up disks by using the disk array's internal disk copy routine to copy the desired OS image in the golden image disk;

receiving a request for an OS image boot-up disk for a computing server by the pool of OS image boot-up disks;

assigning an OS image boot-up disk from the pool of OS image boot-up disks to the computing server upon receiving the request; and booting-up the computing server using the assigned OS image boot-up disk.

11. The article of claim 10, wherein, in determining the upper and lower number of OS image boot-up disks, the utility computing environment comprises an average number of requests received for OS image boot-up disks from one or more computing servers during a predetermined amount of time.

12. The article of claim 10, wherein assigning the OS image boot-up disk from the pool of OS image boot-up disks to the computing server comprises:

determining whether required number of OS image boot-up disks are available in the pool of OS image boot-up disks in the disk array upon receiving a request for an OS image boot-up disk;

if not, putting the request for the OS image boot-up disk on hold and filling the pool of OS image boot-up disks such that the number of OS image boot-up disks in the disk array is greater than or equal to the lower number of OS image boot-up disks and lesser than or equal to the upper number of OS image boot-up disks by using the disk array's internal disk copy routine to copy the desired OS image in the golden image disk;

if so, assigning an OS image boot-up disk from the pool of OS image boot-up disks to the computing server upon receiving the request for an OS image boot-up disk or if there are any requests for an OS image boot-up disk on hold; and if so, assigning an OS image boot-up disk if there is a request for an OS image boot-up disk on hold.

13. The article of claim 10, further comprising:

determining whether number of available OS image boot-up disks in the disk array is below the lower number of OS image boot-up disks;

if so, filling the pool of OS image boot-up disks such that the number of OS image boot-up disks in the disk array is greater than or equal to the lower number of OS image boot-up disks and lesser than or equal to the upper number of OS image boot-up disks by using the disk array's internal disk copy routine to copy the desired OS image in the golden image disk;

if not, receiving a request for an OS image boot-up disk for a computing server by the pool of OS image boot-up disks; and if not, determining whether there is a request on hold for an OS image boot-up disk and assigning the OS image boot-up disk.

14. A computer system comprising:

a processor; and a memory coupled to the processor, the memory having stored therein code which when decoded by the processor, the code causes the processor to perform a method comprising:

forming a pool of OS image boot-up disks in a disk array using the disk array's internal disk copy routine and a golden image disk, wherein forming the pool of OS image boot-up disks using the disk array's internal disk copy routine comprises:

determining an upper number of OS image boot-up disks and a lower number of OS image boot-up disks for the pool of OS image boot-up disks based on a utility computing environment parameter;

initializing a pool of OS image boot-up disks in the disk array with the golden image disk using the disk array's internal disk copy routine; and filling the pool of OS image boot-up disks such that the number of OS image boot-up disks in the disk array is greater than or equal to the lower number of OS image boot-up disks and lesser than or equal to the upper number of OS image boot-up disks by using the disk array's internal disk copy routine to copy the desired OS image in the golden image disk;

receiving a request for an OS image boot-up disk for a computing server by the pool of OS image boot-up disks;

assigning an OS image boot-up disk from the pool of OS image boot-up disks to the computing server upon receiving the request; and booting-up the computing server using the assigned OS image boot-up disk.

15. The system of claim 14, wherein, in determining the upper and lower number of OS image boot-up disks, the utility computing environment comprises an average number of requests received for OS image boot-up disks from one or more computing servers during a predetermined amount of time.

16. The system of claim 14, wherein assigning the OS image boot-up disk from the pool of OS image boot-up disks to the computing server comprises:

determining whether required number of OS image boot-up disks are available in the pool of OS image boot-up disks in the disk array upon receiving a request for an OS image boot-up disk;

if not, putting the request for the OS image boot-up disk on hold and filling the pool of OS image boot-up disks such that the number of OS image boot-up disks in the disk array is greater than or equal to the lower number of OS image boot-up disks and lesser than or equal to the upper number of OS image boot-up disks by using the disk array's internal disk copy routine to copy the desired OS image in the golden image disk;

if so, assigning an OS image boot-up disk from the pool of OS image boot-up disks to the computing server upon receiving the request for an OS image boot-up disk or if there are any requests for an OS image boot-up disk on hold; and if so, assigning an OS image boot-up disk if there is a request for an OS image boot-up disk on hold.

17. The system of claim 14, further comprising:

determining whether a number of available OS image boot-up disks in the disk array is below the lower number of OS image boot-up disks;

if so, filling the pool of OS image boot-up disks such that the number of OS image boot-up disks in the disk array is greater than or equal to the lower number of OS image boot-up disks and lesser than or equal to the upper number of OS image boot-up disks by using the disk array's internal disk copy routine to copy the desired OS image in the golden image disk;

if not, receiving a request for an OS image boot-up disk for a computing server by the pool of OS image boot-up disks; and if not, determining whether there is a request on hold for an OS image boot-up disk and assigning the OS image boot-up disk.

* * * * *